United States Patent
Fan et al.

(10) Patent No.: US 6,469,847 B1
(45) Date of Patent: Oct. 22, 2002

(54) TEMPERATURE COMPENSATED OPTICAL FILTER

(75) Inventors: Weixing Fan, San Jose, CA (US);
Zhibin Yan, Milpitas, CA (US);
Chung-Ho Hsia, San Jose, CA (US)

(73) Assignee: JDS Uniphase Corp., San Jose, CA (US)

( * ) Notice: Subject to any disclaimer, the term of this patent is extended or adjusted under 35 U.S.C. 154(b) by 0 days.

(21) Appl. No.: 09/644,144

(22) Filed: Aug. 22, 2000

(51) Int. Cl.[7] .......................... G02B 5/22; G02B 27/00; G02B 6/28
(52) U.S. Cl. ................ 359/885; 359/578; 359/579; 359/127; 385/24
(58) Field of Search .............................. 385/24, 73, 27; 359/578, 579, 885, 124, 127, 886, 887

(56) References Cited

U.S. PATENT DOCUMENTS 4,813,756 A * 3/1989 Frenkel et al. ............... 385/73
6,269,202 B1 * 7/2001 Lee et al. ..................... 385/24

* cited by examiner

Primary Examiner—Audrey Chang
(74) Attorney, Agent, or Firm—Hall, Priddy, Myers & Vande Sande

(57) ABSTRACT

An optical filter assembly is provided which includes a first optical filter and a first counteracting ring. The first optical filter is of a filter material that transmits a selected transmission range within a wider range of wavelength of light, and reflects another selected reflection range of the wavelengths. The filter material has a refractory index, whereby heating of the first optical filter tends to cause an increase in refractory index with a corresponding increase in the transmission range in a first direction. The counteracting ring is attached to the first optical filter so that at least some of the light transmits through an aperture in the counteracting ring. Heating of the first counteracting ring causes enlargement of the first counteracting ring, which stretches the first optical filter. The selected transmission range is thereby at least partially stabilized.

14 Claims, 3 Drawing Sheets

TEMPERATURE COMPENSATED OPTICAL FILTER

BACKGROUND OF THE INVENTION

1). Field of the Invention

This invention relates to an optical filter, and in particular to a temperature compensated wavelength division multiplexing (WDM) optical filter.

2). Discussion of Related Art

Light filters are used for demultiplexing or multiplexing light in optical a fiber networks. A beam of light is transmitted from an input optical fiber through a light filter layer. The light filter layer is made of a material which transmits a selected range of wavelengths of the light and reflects another range of the wavelengths. It may be important to maintain a range of optical frequencies of transmitted light relatively stable for purposes of further processing of the light. There should be relatively little or no shift in selected transmitted wavelengths, in particular with an increase in temperature.

SUMMARY OF THE INVENTION

Accordingly, the present invention relates to an optical filter assembly comprising:

a first optical filter having a first and a second face, one of which is exposed to an incident beam of light, the first optical filter having a refractive index and being of a filter material that transmits a selected transmission range of wavelengths defining a center wavelength, and that reflects a reflection range of the wavelengths, a change in ambient temperature of the first optical filter causing a change in the refractive index with a corresponding change in the center wavelength of the transmission range; and a first counteracting ring having a higher coefficient of thermal expansion than the filter material attached to the first or the second face of the first optical filter;

whereby a rise in the ambient temperature of the optical filter assembly results in a given length of the first counteracting ring to expand more than a same length of the first optical filter, which causes stretching of the first optical filter resulting in a reduction in thickness therein with a corresponding decrease in the center wavelength of the transmission range of wavelengths, thereby at least partially compensating for an increase in center wavelength caused by the rise in the ambient temperature of the optical filter assembly.

BRIEF DESCRIPTION OF THE DRAWINGS

The invention is further described by way of example with reference to the accompanying drawings wherein.

DETAILED DESCRIPTION OF THE INVENTION

Figure 1:
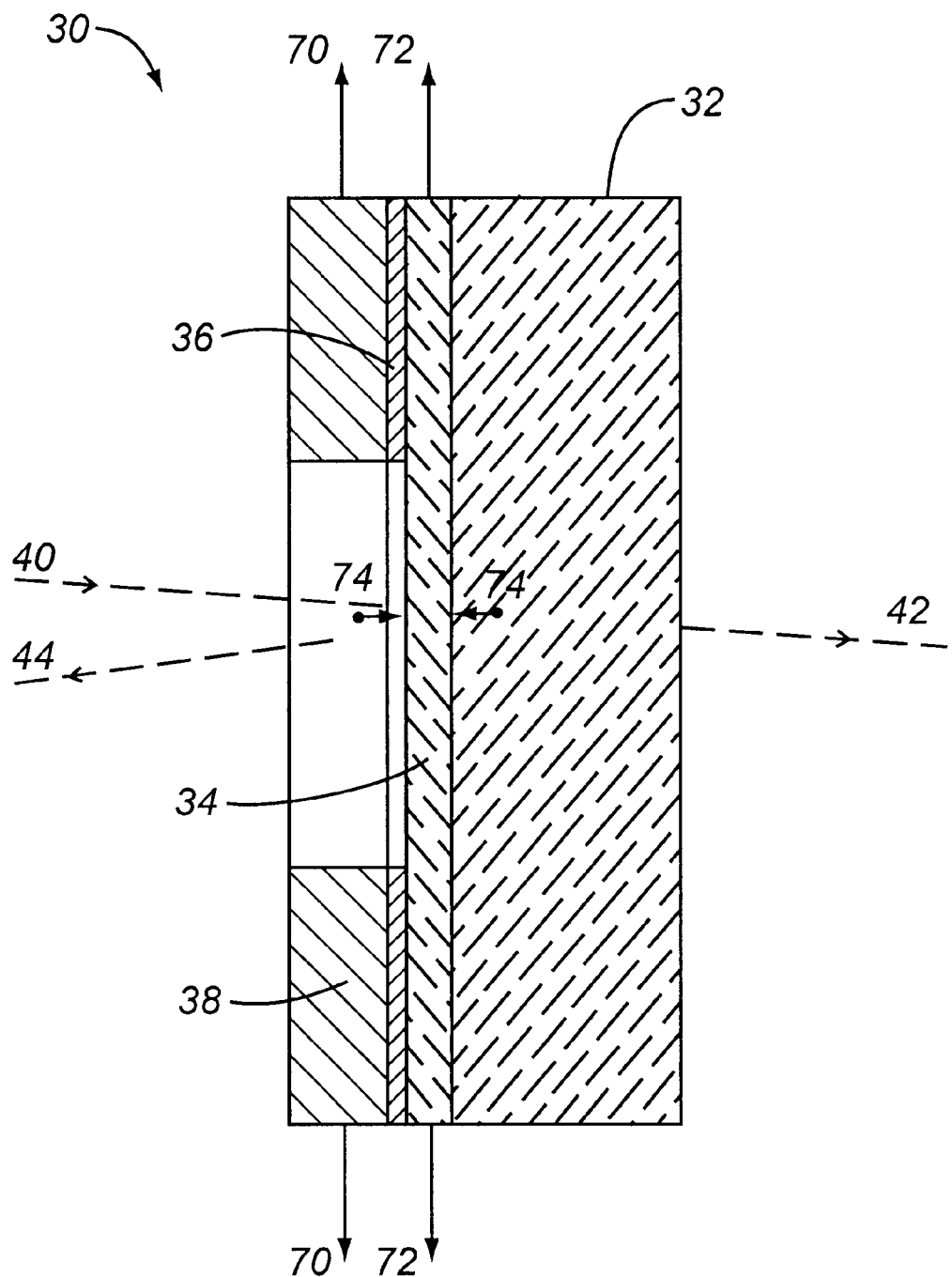
FIG. 1 is a cross-sectional side view of the components of a light filter assembly according to an embodiment of the invention.

FIG. 1 of the accompanying drawings illustrates components of a light filter assembly 30 according to an embodiment of the invention, including a transmissive glass substrate 32, a light filter layer 34, an epoxy layer 36, and a metal counteracting ring 38.

The light filter layer 34 is coated onto and thereby attached to the transmissive substrate 32. A light beam 40 directed towards the light filter layer 34 is in part transmitted through the light filter layer 34 and the transmissive substrate 32 in the form of the transmitted beam 42, and in part reflected from the light filter layer 34 in the form of the reflected beam 44. The light beam 40 may have a wide range of wavelengths and the light filter layer 34 may be made of a material or materials that filter the light so that the transmitted beam 42 includes only light from a selected range of wavelengths within the wider range of wavelengths of the light beam 40. The remainder of the light, i.e. the wavelengths not transmitted by the transmitted beam 42, is reflected in the form of the reflected beam 44 so that the reflected beam 44 includes light having a reflected range of wavelengths not included in the transmitted beam 42.

It may occur that the assembly 30 heats up due to operation or due to environmental conditions. Heating of the light falter layer 34 tends to cause an increase in a refractory index of the light filter material of the light filter layer 34. An increase in a refractory index of the light filter layer, in turn, causes an increase in a center wavelength of tire wavelengths of the transmitted beam 42 according to the equation:

$$\Delta \lambda_c \alpha \Delta n / n$$

where $\lambda_c$ is the center wavelength and n is the refractive index.

Figure 2:
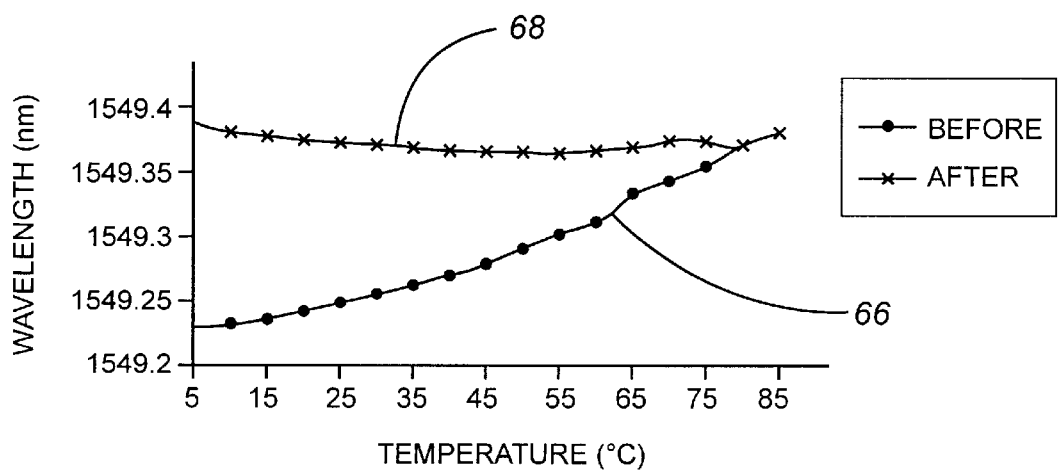
FIG. 2 is a graph illustrating how a counteracting ring of the components in FIG. 1 counteracts a shift in wavelength of filtered light due to an increase intemperature of an optial filter of the assembly.

FIG. 2 illustrates what tends to happen to a center wavelength of the transmitted beam 42 with an increase in temperature. Temperature is given on a horizontal axis in degrees celcius (° C.) and a center wavelength of the transmitted beam 42 is given on a vertical axis in nanometers (nm). The center wavelength of the transmitted beam 42 is plotted along the line 66. The line 66 therefore illustrates what tends to happen to the center wavelength of the transmitted beam 42 due to an increase in temperature and a corresponding increase in the refractory index, in the absence of any effects by the counteracting ring 38. The center wavelength of the transmitted beam 42 is about 1549.235 nm when the light filter layer 34 and the transmissive substrate 32 are at 10° C. The center wavelength tends to increase substantially linearly with an increase in temperature so that the center wavelength of the transmitted beam 42 tends to be about 1549.38 nm at 85° C. There is thus an increase of 0.15 nm in 75° C., or a linear increase of about 2 pm/°C. The tendency for the center wavelength to shift along the line 66 with an increase in temperature is counteracted by the counteracting ring 38 so that an actual change in the center wavelength is along the line 68.

Referring again to FIG. 1, the epoxy layer 36 is located between a surface of the light filter layer 34 and the counteracting ring 38 so as to attach the counteracting ring 38 to the light filter layer 34. Heating of the counteracting ring 38 causes expansion thereof in a direction 70. The counteracting ring 38 has a coefficient of thermal expansion of for example about 17 ppm/°C. which is more than a coefficient of thermal expansion of the light filter layer 34 and more than a coefficient of thermal expansion of the transmissive substrate 32. Because of the higher coefficient of thermal expansion of the counteracting ring 38, a given length of the counteracting ring 38 expands more than a given length of the light filter layer 34, and a given length of the counteracting ring 38 expands more than a given length of the transmissive substrate 32. The counteracting ring 38 tends to stretch the light filter layer 34, and the transmissive substrate 32 in a direction 72 which is in a plane of the light filter layer 34. In another embodiment another counteracting ring may be used, depending on requirement, having a coefficient of thermal expansion between 13 ppm/°C. and 19 ppm/°C.

Stretching of the light filter layer 34 in the direction 72 by the counteracting ring 38 tends to cause a reduction in thickness of the light filter layer in a direction 74. An increase in thickness of the light filter layer causes an increase in a center wavelength of the wavelengths of the transmitted beam 42 according to the equation:

$$\Delta\lambda_c \alpha \Delta d/d$$

where $\lambda_c$ is the center wavelength and d is the thickness

In combination therefore, a total change in the center wavelength is expressed as $$\Delta\lambda_c \alpha \Delta n/n + \Delta d/d.$$

Heating causes an increase in the refractory index n and a decrease in the thickness d. By correctly selecting the material of the counteracting ring, any positive change in $\Delta n/n$ can be counteracted by a negative change in $\Delta d/d$ so that $\Delta\lambda_c$ remains substantially zero.

It can also be said that heating of the light filter layer 34 tends to cause a shift in a center wavelength of the transmission range in one direction, and that the effect of the counteracting ring 38 is to tend to cause a shift in the transmission range in an opposite direction so that the selected transmission range remains substantially stable.

Referring again to FIG. 2 it can be seen from line 68 that the center wavelength of the selected transmission range of the transmitted beam 42 is about 1549.38 nm at 10° C. and about the same at 85° C. The selected transmission range falls slightly between these extremes to about 1549.37 nm, thus only about 10 pm.

Figure 3:
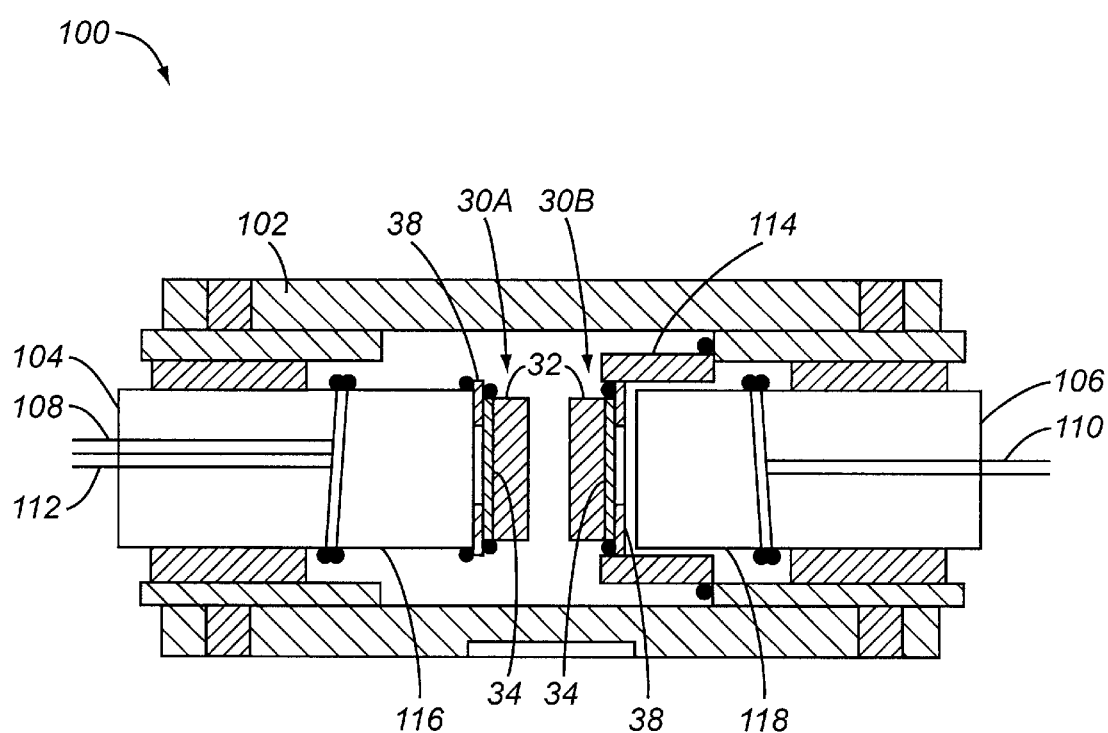
FIG. 3 is a sectional side view of a light filter including the components of FIG. 1.

FIG. 3 illustrates a light filter 100, and two sets of the components 30A and 30B shown in FIG. 2. In addition, the light filter 100 includes a tubular support structure 102, tubed glass capillaries 104 and 106, an input optical fiber 108, a transmission optical fiber 110, at a reflection optical fiber 112, a metal holder 114, and two lenses 116 and 118. The input optical fiber 108 and the reflection optical fiber 112 are inserted into the glass capillary 104 and terminate at an air gap near the lens 116. The glass capillary 104 is rigidly secured to the tubular support structure 102. The lens 116 is secured to the glass capillary 104 and one set of the components 30A is attached to the lens 116. The set of component 30A is thus secured to and within the tubular support structure 102.

The transmission optical fiber 110 is located within the glass capillary 106 and terminates at an air gap near the lens 118. The lens 118 is attached to the glass capillary 106 which, in turn, is secured to the tubular support structure 102. The lens 118 is thereby unmovably secured to and within in the tubular support structure 102.

The counteracting ring 38 of the components 30B is secured within and to the metal holder 114. The metal holder 114 is made of the same material as the counteracting ring 38. The metal holder 114 is initially movably secured to the tubular support structure 102. A device (not shown) pivots the metal holder 114, and therefore also the components 30B, relative to the tubular support structure 102 to a required degree, whereafter the metal holder 114 is secured to the tubular support structure.

In use, light is transmitted through the input optical fiber into the lens 116. The lens 116 focuses the light and also causes a change in direction in the light so that there is an incidence angle between light transmitted through the input optical fiber 108 and light being transmitted through the lens 116. Some of the light is reflected by the light filter layer 34 of the components 30A and, due to the angle, is transmitted back through the lens 116 to the reflection optical fiber 112. The angle thus allows for the light to reach the reflection optical fiber 112. No shift in a center wavelength of transmitted light would occur should the light strike the light filter layer 34 of the component 30A at right angles (at a given temperature). However, the angle also causes a shift in the selected transmission range of light being transmitted through the component 30A. The orientation of the component 30B allows for correction in the shift of the selected transmission range. By pivoting the metal holder 114, the light filter layer 34 and the transmissive substrate 32 of the components 30B are also pivoted. These components are pivoted to a degree which ensures that light striking the transmissive substrate 32 of the components 30B is at a correction angle relative to a surface of the transmissive substrate 32, which ensures that there is a return shift in the wavelengths of the transmitted light.

The light then enters the lens 118 and travels into an end of the transmission optical fiber 110 whereafter the light is transmitted therethrough. Any shift in wavelengths of a transmitted beam due to spacing between a center line of the input optical fiber 108 and the reflection optical fiber 112 and a consequent angle at which light strikes the components 30A is thus corrected by the orientation of the components 30B so that a desired range of wavelengths of the light transmits through the transmission optical fiber 110 is maintained.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. An optical filter assembly comprising:
   a first optical filter having a first and a second face, one of which is exposed to an incident beam of light, the first optical filter having a refractive index and being of a filter material that transmits a selected transmission range of wavelengths defining a center wavelength, and that reflects a reflection range of the wavelengths, a change in ambient temperature of the first optical filter causing a change in the refractive index with a corresponding change in the center wavelength of the transmission range; and
   a first counteracting ring having a higher coefficient of thermal expansion than the filter material, the first counteracting ring attached to the first or the second face of the first optical filter;
   whereby a rise in the ambient temperature of the optical filter assembly results in a given length of the first counteracting ring to expand more than a same length of the first optical filter, which causes stretching of the first optical filter resulting in a reduction in thickness therein with a corresponding decrease in the center wavelength of the transmission range of wavelengths, thereby at least partially compensating for an increase in center wavelength caused by the rise in the ambient temperature of the optical filter assembly.

2. The optical filter assembly of claim 1, wherein the first counteracting ring material is a metal.

3. The optical filter assembly of claim 1, wherein the ring material has a coefficient of thermal expansion of at least 14 ppm/°C.

4. The optical filter assembly of claim 1, wherein the first counteracting ring is round with a circular aperture extending therethrough.

5. The optical filter assembly of claim 1, further comprising:
   a first transparent substrate onto which the first optical filter is mounted so that at least some of the light transmits through the first transparent substrate in addition to passing through an aperture in the first counteracting ring and the first light filter.

6. The optical filter assembly of claim 1, further comprising:
   an input optical fiber for transmitting the incident beam of light optically coupled to the first optical filter on one side thereof; and
   a transmission optical fiber having an end through which light of the selected transmission range enters to be transmitted therethrough optically coupled to the first optical filter on another side thereof.

7. The optical filter assembly of claim 6, further comprising:
   a reflection optical fiber optically coupled to the first optical filter on the one side thereof having an end positioned so that the selected reflection range of wavelengths enters the reflection optical fiber to be transmitted therethrough.

8. The optical filter assembly of claim 7, further comprising:
   a support structure for supporting the first optical filter, the first counteracting ring, the input optical fiber, the output optical fiber, and the refection optical fiber, light from the input optical fiber being directed towards the first optical filter at an incidence angle other than at right angles resulting in a shift in the center wavelength of the light transmitting through the first optical filter; and
   a second optical filter positioned at a correction angle relative to light transmitting through the first optical filter, the correction angle resulting in a shift of the center wavelength in a direction opposite to the shift due to the incidence angle.

9. The optical filter assembly of claim 8, further comprising:
   a second counteracting ring, having a higher coefficient of thermal expansion than the second optical filter, mounted on a face of the second optical filter; whereby heating of the second counteracting ring causes a given length of the second counteracting ring to expand more than a same length of the second optical filter, which causes stretching of the second light filter layer resulting in a reduction in thickness therein with a corresponding decrease in the center wavelength of the transmission range of wavelengths, thereby at least partially compensating for an increase in center wavelength caused by heating the second counteracting ring.

10. The optical filter assembly of claim 9, further comprising:
    a holder secured to the second counteracting ring, and pivotally mounted relative to the support structure for adjusting the correction angle of the second optical filter.

11. An optical filter assembly comprising:
    an optical filter including a light transmissive substrate and one or more filter layers supported by the light transmissive substrate for transmitting a selected range of wavelengths defining a center wavelength, the optical filter having an index of refraction that varies with temperature, and an overall thickness that varies with temperature; and
    a counteracting ring of a material having a coefficient of thermal expansion different than the filter and the substrate, attached to a face of the optical filter, whereby a potential shift in the center wavelength caused by a change in temperature of the optical filter is at least partially counteracted by a radially directed stress applied by the counteracting ring upon the face of the optical filter resulting in an expansion or a reduction in thickness of the optical filter.

12. The optical filter assembly of claim 11, wherein the counteracting ring material is a metal.

13. The optical filter assembly of claim 11, wherein the counteracting ring material has a coefficient of thermal expansion of at least 14 ppm/°C.

14. The optical filter assembly of claim 11, wherein the counteracting ring is round with a circular aperture extending therethrough.

* * * * *